Figure 1:
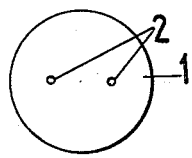

Jan. 21, 1964 R. L. BREADNER 3,118,752
MANUFACTURE OF GLASS ARTICLES
Filed March 2, 1960 2 Sheets-Sheet 1

INVENTOR
ROBERT LEONARD BREADNER
ATTORNEYS

Jan. 21, 1964     R. L. BREADNER     3,118,752
MANUFACTURE OF GLASS ARTICLES
Filed March 2, 1960     2 Sheets-Sheet 2

INVENTOR.
ROBERT LEONARD BREADNER
By
ATTORNEYS

United States Patent Office 3,118,752
Patented Jan. 21, 1964

3,118,752
MANUFACTURE OF GLASS ARTICLES
Robert Leonard Breadner, Harrow, England, assignor to The General Electric Company Limited, London, England
Filed Mar. 2, 1960, Ser. No. 12,309
Claims priority, application Great Britain Mar. 12, 1959
4 Claims. (Cl. 65—32)

This invention relates to the manufacture of articles consisting wholly or partly of a solid glass body having at least one shaped surface, such as the glass buttons and discs of the kind employed as the bases of some forms of thermionic and cold cathode valves, transistors, and other similar electrical devices, the present application being a continuation-in-part of copending application Serial No. 788,096, filed January 21, 1959.

Glass bodies of the above kind are often made by pressing the molten glass to shape with a plunger whilst it is contained within an appropriately shaped mould, but where they are of small dimensions this may not always be convenient, especially when large numbers of the bodies are required to be produced, and an object of the present invention is to provide an alternative method of forming these glass bodies which is particularly suitable for the mass-production of bodies of small dimensions.

According to the present invention the manufacture of shaped glass bodies includes the steps of placing a corresponding plurality of said bodies in shaped recesses in at least one mould member, which recesses are closed at the base and have surfaces which are resistant to wetting by glass, heating the glass charges to the appropriate glass melting temperature and simultaneously rotating the mould member about an axis, with the bases of the recesses directed outwards away from said axis, at a speed sufficient to cause the centrifugal force generated to press the molten glass in each recess towards the base of the recess, permitting the charges to cool while rotation of the mould member is continued for causing each said charge to solidify into the shape of the part of the recess in which it is contained in the molten condition, and subsequently removing the solidified charges from the said recesses. The surface of the bodies which have been in contact with the walls of the recesses will have had imparted to them the shapes of those walls whilst the surfaces of the bodies which were at the mouths of the recesses will in general be substantially flat.

The latter surfaces might in some cases have a slight concavity the extent of which depends upon the distance of the recesses from the axis of rotation, but where this is undesirable it can be largely avoided by making this distance suitably large compared with the size of the bodies produced.

Preferably the rotation of the mould members is effected in a centrifuge capable of accommodating a large number of mould members, so that a correspondingly large number of glass bodies can be produced in a single operation of the centrifuge. The centrifuge in such an arrangement is preferably designed to be heated within a furnace. A number of mould members can conveniently be mounted on or form a part of a common holder.

After the removal of the glass bodies from each of the mould members fresh glass charges can be placed in the recesses and the process repeated.

In general carbon will be the most suitable material for forming the surfaces of the recesses. Preferably each mould member incorporates at least one carbon block and the recesses are formed in the surface of the block which is arranged to face inwards towards the axis of the centrifuge during the manufacture of the bodies. Alternatively the mould members may be formed of another material with the surfaces of the recesses coated with carbon.

The glass charges employed are conveniently in the form of short lengths of glass rod or tubing of substantially uniform size although they may alternatively consist of sintered glass beads. If desired means can be provided for holding each charge within its respective recess on loading the mould members into the centrifuge and before the operation of the latter.

The method of the invention can be employed for forming glass bodies having one or more members, such as metal wires or pins, sealed into them, for example for providing electrically conducting paths through the glass, and in the manufacture of glass bodies of this kind each mould member is preferably provided with means for supporting the members in predetermined positions within the recesses during the heating and centrifuging process so that they are sealed to the bodies which are formed on the cooling of the glass. The members may, for example, be arranged to be held in position by fitting into accurately-positioned locating holes in the bases of the recesses.

The glass employed in forming such bodies must, of course, be suitably matched to the members sealed into them as regards their thermal coefficients of expansion in order to avoid the setting up of excessive stresses in the glass on cooling which might lead to breakages of the seals which are formed.

In some cases each of the recesses may be formed with one or more projections having surfaces resistant to wetting by glass upstanding from the base of the recess so as to form holes through or cavities in the glass bodies which are formed within it.

Holes might be required, for example, in glass bodies designed to form parts of the envelopes of some forms of electrical devices, for enabling electrical conductors to be sealed through them at a subsequent stage in the manufacture of the devices.

The projections may be formed integrally with the mould members, if desired, although in some cases, particularly where holes of relatively small diameter compared with their length are required the projections might be provided by separate members arranged to be supported within the recesses for example by fitting into locating holes in the bases of the recesses.

The members must, of course, be removable from the glass bodies which are formed and are conveniently provided by metal wires or pins having a significantly higher coefficient of thermal expansion than that of the glass, and which are not readily wetted by the glass during the formation of the bodies.

In some cases the centrifuge employed may be of the closed type and filled with an inert gas, such as nitrogen, during the heating in the furnace, and where such a centrifuge is employed for forming glass bodies having holes in them, unoxidized copper pins can be employed for forming the holes. Such pins can readily be pulled from the bodies, to leave holes in the bodies, after they have been removed from the holders, the inert gas preventing oxidation of the wires during the heating and centrifuging process.

The centrifuge can most conveniently be formed of a highly refractory material which can be directly heated whilst rotating by means of air/gas flames passing through an aperture in the wall of the furnace from a burner located outside the furnace. Silica or a suitably refractory metal or alloy, such as chromite are suitable materials for this purpose.

In such an arrangement the rapid rotation of the centrifuge ensures the required even heating of the centrifuge and of the mould members within it.

After the centrifuge has been heated to the required glass melting temperature it can be cooled by opening the furnace and shutting off the gas jets. In some cases jets of air can be blown on to the centrifuge to assist in cooling.

The close temperature control obtained by effecting the heating of the centrifuge within a furnace, which control is assisted by the turbulence produced by the centrifuging enables glass bodies of consistent quality to be readily obtained.

The application of the invention to the mass-production of two different forms of glass bodies will now be described by way of example with reference to FIGURES 1 to 8 of the accompanying schematic drawings.

In these drawings

Figure 2:
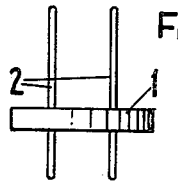
Figure 3:
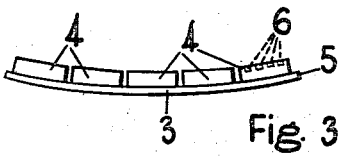
Figure 4:
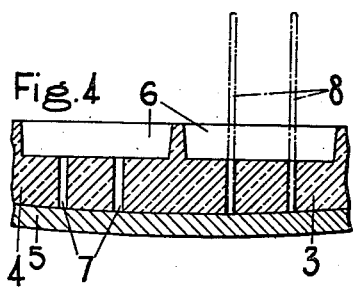
Figure 6:
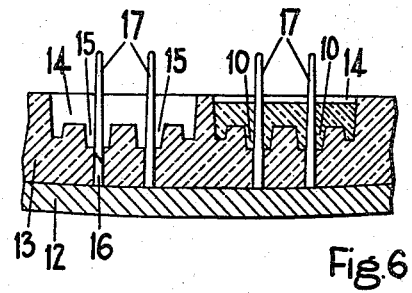
Figure 5:
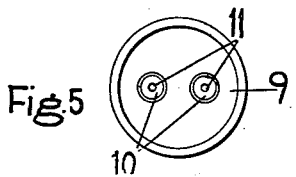
Figure 8:
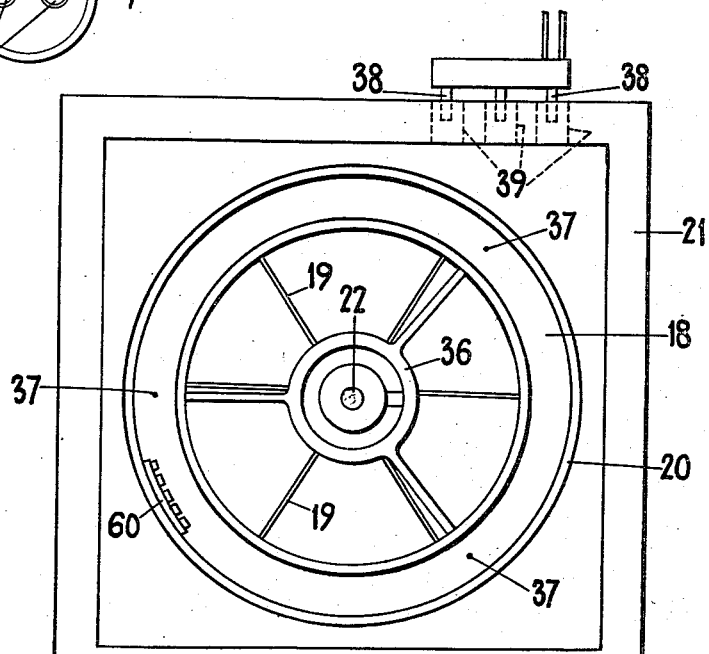
Figure 7:
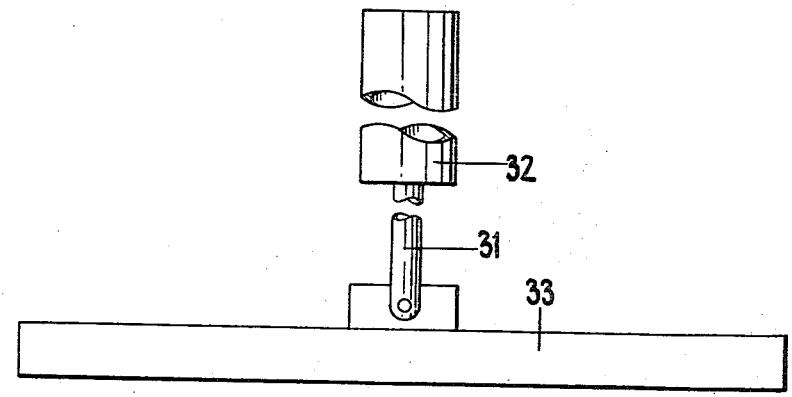
Figure 7:
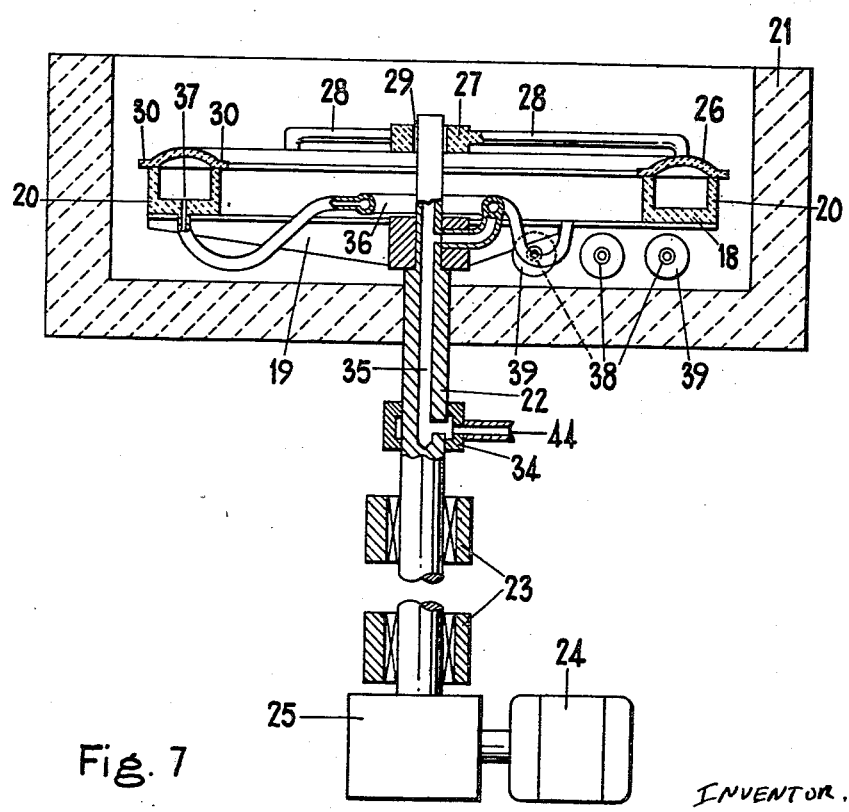

FIGURES 1 and 2 represent a plan view and an axial section respectively of one of the glass bodies, FIGURE 3 represents a side view of one form of holder suitable for use in the mass production of bodies of the kind illustrated in FIGURES 1 and 2, and FIGURE 4 represents a section through part of the holder;

FIGURE 5 represents a plan view of the second form of glass body suitable for manufacture by the method of the invention, FIGURE 6 represents a section through a part of a holder for use in mass-producing bodies of the kind illustrated in FIGURE 5 with one such body shown in axial section within the holder, and FIGURES 7 and 8 represent a sectional elevation and a plan view respectively of one form of centrifuge apparatus suitable for forming the glass bodies illustrated in FIGURES 1 and 2 and FIGURES 5 and 6.

Referring now to FIGURES 1 and 2 the glass body illustrated therein comprises a circular glass disc 1 having two copper-clad nickel-iron wires 2 extending axially through it. The disc forms part of the envelope of an electrical device and is arranged to be sealed around its periphery to one end of a hollow cylindrical member providing another part of the envelope. The parts of the wires on one side of the disc are arranged to be connected to the operating parts of the device and constitute conducting supports for said parts within the envelope, and the parts of the wires on the opposite side of the disc provide terminals for connecting the device into an electrical circuit.

For use in the mass production of such bodies in accordance with the invention there are provided a plurality of holders 3 (see FIGURES 3 and 4) each consisting of a number of carbon blocks 4, which provide the said mould members, mounted on the concave surface of a rectangular nickel base plate 5 bent to arcuate form along its length. Each of the carbon blocks 4 is provided in the surface remote from the base plate 5 with a number of cylindrical recesses 6 having a diameter which corresponds to that of the glass bodies, and a depth which is slightly greater than the thickness of the bodies.

Within each recess two holes 7, located on a diameter of the recess on opposite sides of its centre, extend through the block towards the base plate 5, the diameters of the holes being such that the wires 2 used in forming the bodies are a sliding fit within them.

In forming the glass bodies a wire is loaded into each of the holes 7, of the holders, the holes serving to support the wires relatively to their respective carbon blocks 4 in the manner indicated at 8 in FIGURE 4. A glass charge in the form of a sintered glass bead having holes for the passage of the wires, is then placed within each of the recesses and the holders are then placed in a centrifuge apparatus, consisting of a centrifuge mounted for rotation about a vertical axis within a furnace, with their arcuate bases coaxial with the axis of rotation and resting against a supporting member and with the recessed surfaces of the carbon blocks directed towards the axis of rotation of the centrifuge. The width of the carbon blocks 4 is the same as that of the base plate 5 so that they serve to support the holders in the desired position, the wires being retained within their respective holes and the beads being supported by the wires.

The centrifuge is then set into rotation and heated by air/gas flames playing directly on the centrifuge through apertures in the side of the furnaces; the heating is continued until the furnace temperature reaches that corresponding to the appropriate glass-melting temperature within the centrifuge, whilst the centrifuge is rotated at a speed to give an acceleration of about 25g at the holders, this causing the molten glass charges to take up the shape of the recesses.

The gas supply is then cut off and air jets allowed to play on the centrifuge whilst still rotating, and with the furnace opened, until the centrifuge has cooled down sufficiently to permit the holders to be removed. The solidified glass charges, each in the form of a disc with a pair of wires sealed through it, may then be removed from the holders.

The glass employed for forming the discs should, of course, be suitably matched to the wires as regards their coefficients of expansion for enabling seals of good quality to be obtained. During the whole of the heating and centrifuging process the centrifuge, which is of a closable type, is filled with nitrogen.

The second glass body which is illustrated in FIGURES 5 and 6 is also in the form of a circular disc 9 having two frusto-conical projections 10 extending axially from one surface of the disc, the projection being located on the same diameter of the disc and equidistant from the disc axis. Two holes 11 extend through the disc along the axes of the two projections 10.

The holders employed for mass-producing bodies of this kind are similar to those illustrated in FIGURES 3 and 4 in that each consists, as shown in FIGURE 6, of an arcuate nickel base plate carrying on its concave surface a number of recessed carbon blocks 13 (only part of one of the blocks being shown). The base of each recess 14 is provided with two smaller recesses 15 of frusto-conical shape for forming the frusto-conical projections 10 of the bodies, and these recesses 15 are each continued by a cylindrical hole 16 coaxial with the recess 15 and of the same diameter as the holes 11 required to be formed in the bodies. Within each of these holes is fitted one end of an unoxidized copper pin 17 which is thus held in position within the corresponding recess 11 and which extends at its opposite end beyond the recessed surface of the respective carbon block.

In forming the glass bodies each of the recesses 14 in a number of holders is provided with a pair of said pins 17, fitted into the respective holes 16, together with a glass charge, and the holders are then loaded into a centrifuge mounted for rotation within a furnace with the recessed surfaces of the carbon blocks directed inwards and with the convex surfaces of the arcuate bases 12 resting against a suitable support.

The centrifuge is then filled with nitrogen and is heated whilst being rotated at an appropriate speed, the glass bodies being formed in the same way as those described with reference to FIGURES 1 and 2.

After the centrifuge has cooled sufficiently the holders are taken out of it, and the glass bodies then removed from the recesses in the holders, the projecting parts of the pins 17 facilitating the removal of the bodies from the recesses 14. The pins 17 are then removed from each of the bodies to leave two holes extending therethrough in the required manner, the nitrogen preventing oxidation of the pins and enabling the withdrawal of the pins from the glass bodies to be readily effected. If desired the parts of the pins which are arranged to lie within the glass bodies can also be given a slight taper, as shown, for further facilitating their removal from the bodies.

The sides of the recesses 6, 14 in each of the two holders may taper inwards slightly towards their bases to facilitate the removal of the bodies from the holders after they have been formed.

A suitable form of centrifuge apparatus is illustrated in FIGURES 7 and 8 and comprises an annular silica tray 18 having upturned sides 20 mounted on a metal frame 19 within a furnace 21, the frame being attached to the top end of a vertical shaft 22 so as to support the tray coaxial with the shaft, and the shaft projecting downwards through the bottom of the furnace into bearing 23 mounted on a suitable supporting framework (not shown). An electric motor 24 provides the drive for the shaft and hence the tray in use of the apparatus, the shaft being coupled to the motor through an appropriate gear system 25.

The annular tray 18 is provided with a close-fitting but detachable silica lid 26 also of annular form and connected to a central boss 27 by means of three radial spokes 28, the boss being provided with a hole 29 arranged to fit over the top of the shaft when the lid is placed onto the tray. The inner and outer edges of the lid are provided with inwardly and outwardly directed flanges 30 respectively which rest on the top edges of the sides of the tray as shown.

The top 33 of the furnace is also detachable to give access to the tray, being conveniently carried by the lower end of a vertical support rod 31 having its upper end attached to a vacuum-actuated piston located within a cylinder 32, catches (not shown) being provided for locking the furnace top in the raised position.

When loaded into the centrifuge apparatus the holders are placed with their arcuate bases fitting against the outer vertical side of the tray as shown at 60 in FIGURE 8 which side provides the supporting member aforesaid, and the lid of the tray is then secured in position.

The top of the furnace is then lowered to the furnace and the manufacture of the glass bodies carried out as previously described. In order to enable the interior of the tray 18 to be filled with nitrogen, or other inert gas, if desired, a gland 34 which can be connected to a suitable supply of the gas through a feed pipe 44 encircles the shaft 22, and communicates with a duct 35 extending along the axis of the shaft, the duct being connected within the furnace to a silica manifold 36 communicating in turn with holes 37 in the base of the tray 18 at three spaced points. Burners 38 supply the air/gas flames which play directly on the tray through apertures 39 in the wall of the furnace in use of the apparatus.

It will be appreciated that the invention is not restricted to the mass-production of glass bodies of the kind illustrated but is also applicable to the manufacture of glass bodies of many other different shapes and designed for use in a variety of different ways.

I claim:

1. A method of manufacturing glass bodies having a glass outer surface of controlled shape, said method including the steps of: placing a plurality of glass charges for forming a corresponding plurality of said bodies in shaped recesses in at least one mold member, which recesses are closed at the base and have surfaces which are resistant to wetting by glass, heating the glass charges to the appropriate glass melting temperature, and simultaneously rotating the mold member about an axis, with the bases of the recesses directed outward away from said axis, at a speed sufficient to cause the centrifugal force generated to press the molten glass in each recess towards the base of the recess, permitting the charges to cool while rotation of the mold member is continued for causing each said charge to solidify into the shape of the part of the recess in which it is contained in the molten condition, and subsequently removing the solidified charges from the said recesses.

2. A method according to claim 1 of manufacturing glass bodies of the kind having a glass outer surface of controlled shape and including at least one metal wire sealed through the glass, wherein a plurality of the wires are mounted in fixed positions in the recesses in the mold member prior to rotation of said member, and are supported in said fixed positions during the heating of the glass charges and their subsequent cooling so as to be sealed to the bodies which are formed.

3. A method according to claim 1 of manufacturing glass bodies of the kind having a glass outer surface of controlled shape and including at least one hole formed therein, wherein metal members having a significantly higher thermal coefficient of expansion than the glass and which are removable from the formed bodies, are mounted in fixed positions within the recesses in the mold member prior to the rotation of said member, and are supported in said fixed positions during the heating of the glass charges and their subsequent cooling so as to project from the bodies which are formed, and, following the removal of the bodies from the recesses, the metal members are withdrawn from the bodies to leave holes therein.

4. A method according to claim 3 wherein the heating of the glass charges is carried out in an inert atmosphere and the metal members consist of unoxidised elongated copper elements.

References Cited in the file of this patent

UNITED STATES PATENTS

| | | |
|---|---|---|
| 1,341,670 | Powell | June 1, 1920 |
| 2,374,269 | Breadner et al. | Apr. 24, 1945 |
| 2,412,925 | Stupakoff | Dec. 17, 1946 |
| 2,429,692 | Joyce | Oct. 28, 1947 |
| 2,450,832 | Kuhlman | Oct. 5, 1948 |
| 2,780,892 | Roovers et al. | Feb. 12, 1957 |
| 2,838,797 | Kolar | June 17, 1958 |
| 2,937,408 | Limpel | May 24, 1960 |
| 2,946,104 | Martin | July 26, 1960 |
| 2,992,513 | Breadner | July 18, 1961 |